United States Patent
Beachem et al.

(10) Patent No.: US 8,566,571 B2
(45) Date of Patent: Oct. 22, 2013

(54) PRE-BOOT SECURING OF OPERATING SYSTEM (OS) FOR ENDPOINT EVALUATION

(75) Inventors: Brent R. Beachem, Riverton, UT (US); Merrill K. Smith, Riverton, UT (US)

(73) Assignee: Novell, Inc., Provo, UT (US)

( * ) Notice: Subject to any disclaimer, the term of this patent is extended or adjusted under 35 U.S.C. 154(b) by 1030 days.

(21) Appl. No.: 12/316,466

(22) Filed: Dec. 12, 2008

(65) Prior Publication Data

US 2010/0153696 A1  Jun. 17, 2010

(51) Int. Cl.
*G06F 9/24* (2006.01)
*G06F 15/177* (2006.01)

(52) U.S. Cl.
USPC ............. 713/2; 713/1; 713/100; 726/1; 726/2

(58) Field of Classification Search
USPC .................................. 713/1, 2, 100; 726/1, 2
See application file for complete search history.

(56) References Cited

U.S. PATENT DOCUMENTS

| | | | |
|---|---|---|---|
| 6,327,660 B1 | 12/2001 | Patel | |
| 6,754,188 B1 | 6/2004 | Garahi | |
| 6,996,706 B1 | 2/2006 | Madden et al. | |
| 7,082,117 B2 | 7/2006 | Billhartz | |
| 7,165,170 B2 | 1/2007 | Rothman et al. | |
| 7,206,931 B2 | 4/2007 | Zimmer et al. | |
| 7,237,102 B2 | 6/2007 | Rothman | |
| 7,243,224 B2 | 7/2007 | Nair et al. | |
| 7,257,704 B2 | 8/2007 | O'Neal | |
| 7,308,703 B2 | 12/2007 | Wright et al. | |
| 7,320,052 B2 | 1/2008 | Zimmer et al. | |
| 7,346,167 B2 | 3/2008 | Billhartz et al. | |
| 7,353,533 B2 | 4/2008 | Wright et al. | |
| 7,412,595 B2 | 8/2008 | Velhal et al. | |
| 7,426,179 B1 | 9/2008 | Harshavardhana et al. | |
| 7,448,030 B2 | 11/2008 | Liu et al. | |
| 7,460,489 B2 | 12/2008 | Sugiarto et al. | |
| 7,478,420 B2 | 1/2009 | Wright et al. | |
| 7,930,728 B2 * | 4/2011 | Zimmer et al. | 726/2 |
| 2002/0072391 A1 * | 6/2002 | Itoh et al. | 455/557 |
| 2002/0161905 A1 | 10/2002 | Haverinen et al. | |
| 2003/0041136 A1 | 2/2003 | Cheline et al. | |
| 2005/0166213 A1 | 7/2005 | Cromer et al. | |
| 2006/0094400 A1 | 5/2006 | Beachem et al. | |

(Continued)

OTHER PUBLICATIONS http://en.wikipedia.org/wiki/Wimax; "WiMax"; Page last modified on Feb. 3, 2009; 18 pages.

(Continued)

*Primary Examiner* — Paul Yanchus, III
*Assistant Examiner* — Michael J Brown
(74) *Attorney, Agent, or Firm* — King & Schickli, PLLC (57) ABSTRACT

Methods and apparatus involve evaluating endpoint computing assets. The endpoint has both a traditional operating system for applications, and the like, and another operating system during a pre-boot phase of operation. During use, the traditional operating system identifies a last evaluation status of the computing device at a time just prior to shutting down. Upon a next booting, the pre-boot operating system loads and examines [reads] the last evaluation status. If the last evaluation status requires any completion action in order to comply with a predetermined computing policy, either or both the operating systems attend to its effectuation, including communication/handoff by way of one or more security agents. In a variety of ways, effectuation occurs by: determining a present location of the computing device, quarantining the computing device from certain network traffic; VPN enforcement; patching applications; firewall involvement; etc. Computer program products are also disclosed.

20 Claims, 7 Drawing Sheets

(56) References Cited

U.S. PATENT DOCUMENTS

| | | | |
|---|---|---|---|
| 2007/0107043 | A1 | 5/2007 | Newstadt |
| 2007/0192867 | A1 | 8/2007 | Miliefsky |
| 2007/0198819 | A1 | 8/2007 | Dickens et al. |
| 2007/0266120 | A1 | 11/2007 | Tallieu et al. |
| 2007/0294520 | A1 | 12/2007 | Leigh et al. |
| 2008/0034416 | A1 | 2/2008 | Kumar et al. |
| 2008/0043760 | A1 | 2/2008 | Venkatraman et al. |
| 2008/0095067 | A1 | 4/2008 | Rao |
| 2008/0144590 | A1 | 6/2008 | Rantanen et al. |
| 2008/0147830 | A1 | 6/2008 | Ridgill et al. |
| 2008/0212503 | A1 | 9/2008 | Lipford |
| 2008/0291841 | A1 | 11/2008 | Joung et al. |
| 2009/0037763 | A1 | 2/2009 | Adhya et al. |
| 2009/0043891 | A1 | 2/2009 | Woo et al. |
| 2010/0058442 | A1 | 3/2010 | Costa |
| 2010/0153696 | A1 | 6/2010 | Beachem et al. |
| 2010/0235514 | A1 | 9/2010 | Beachem |
| 2010/0293610 | A1 | 11/2010 | Beachem et al. |
| 2012/0096510 | A1 | 4/2012 | Bentall |

OTHER PUBLICATIONS http://en.wikipedia.org/wiki/Mesh_networking; "Mesh networking"; Page last modified on Feb. 1, 2009; 4 Pages.

http://www.novell.com/products/zenworks/endpointsecuritymanagement/; "Novell ZENworks Endpoint Security Management"; Printed on Feb. 3, 2009; 1 Page.

http://www.novell.com/products/zenworks/endpointsecuritymanagement/productinfo; "Novell ZENworks Endpoint Security Management"; Printed on Feb. 3, 2009; 1 Page.

http://www.novell.com/rc/docrepository/public/37/baseddocument.2007-08-10.2324835973/4622065_en.pdf, "Novell ZENworks Endpoint Security Management; Total Control from a Single Console", Printed on Feb. 3, 2009; 11 Pages.

http://www.novell.com/rc/docrepository/public/25/basedocument.2008-03-13.5186701808/securing_the_corporate_desktop_presentation_en.pdf, "Novell Endpoint Security Management"; Printed on Feb. 3, 2009; 32 Pages.

http://www.novell.com/rc/docrepository/public/16/basedocument.2008-03-12.2205304456/4641033_en.pdf, "Novell ZENworks Endpoint Security Management"; Printed on Feb. 3, 2009; 27 Pages.

http://computer.howstuffworks.com/vpn10.htm; "How Virtual Private Networks Work"; Jeff Tyson; Printed May 5, 2009; 5 Pages.

http://en.wikipedia.org/wiki/VPN; "Virtual private network"; Page last modified on Apr. 22, 2009; 8 Pages.

http://www.nacs.uci.edu/security/vpn/vpninfo.html#why; "VPN Information"; Updated: Feb. 4, 2008; 2 Pages.

http://www.lacisd.org/app/webroot/files/14_techdayatt1_Zenworks%20overview%2012-08-08.pdf; "Novell® ZENworks® Enterprise Systems Management"; © Novell, Inc,; 45 Pages.

download.microsoft.com/download/e/7/6/e76fdda3-5c2c-4fbb-9c6f-3bcd0ed4b8ef/Firewall_Corewp.doc "Microsoft Internet Security & Acceleration Server 2006, ISA Server 2006 Firewall Core"; Jun. 2006; 23 Pages.

Office Action in U.S. Appl. No. 12/467,553 dated Aug. 10, 2011.

Preboot Execution Environment (PXE) Specification, Version 2.1, Sep. 20, 1999, Intel Corporation, 103 pages.

Intel vPro Technology for Notebook and Desktop PCs, (undated), Intel Corporation, http://www.intel.com/technology/vpro/index.htm, 2 pages.

Preboot Execution Environment, Updated Aug. 14, 2008, Wikipedia, http://en.wikipedia.org/wiki/Preboot_Execution_Environment, 5 pages.

U.S. Appl. No. 12/381,624 Office Action dated Oct. 7, 2011.

U.S. Appl. No. 12/467,553 Office Action dated Nov. 30, 2011.

Non-Final Office Action for U.S. Appl. No. 12/381,624 dated Dec. 20, 2012.

\* cited by examiner

PRE-BOOT SECURING OF OPERATING SYSTEM (OS) FOR ENDPOINT EVALUATION

FIELD OF THE INVENTION

Generally, the present invention relates to computing devices and computing environments involving endpoint assets, such as laptops, PDAs, phones, etc. for an enterprise or other entity. Particularly, although not exclusively, it relates to evaluation of these assets, e.g., troubleshooting, repairing, determining status, etc., especially by way of a pre-boot, secure operating system. The invention also relates to the field of computing tasks in a mobile computing environment as assets move between locations during use. Other features contemplate computing arrangements, computing architecture and computer program products, to name a few.

BACKGROUND OF THE INVENTION

Today, corporate computing assets, such as laptops, phones, PDAs, etc., are utilized outside corporate firewalls more than ever before. With ever more employees either working from home or "on the road," controlling and managing corporate information technology (IT) assets is becoming a difficult or serious problem. For instance, troubleshooting and repairing remote endpoints requiring manual, "hands on," intervention are extremely costly to companies or IT departments. While a few technologies have emerged that facilitate diagnosis, and occasional remediation, the means of accomplishing this are not secure. As such, they risk security not only to the hardware and data files of the endpoint device, but also to the entire corporate enterprise as infected devices are brought behind and used inside the corporate firewall.

More particularly, some of the present technologies rely on either network communication (level 2 (MAC) or level 3 (IP)) to the endpoint, 802.1X authentication and information exchange, or some type of "pre-boot" Operating System. While minimally useful, the former is problematic for lack of having an IP stack up and functioning, while the latter only typically diagnoses hardware items, such as a bad drive, without any attendant capability to diagnose more rigorous or esoteric items such as non-complying computing policies, encryption functionality, VPN enforcement, or the like. Neither can certainly do it as a function of a particular location of the endpoint computing asset as the asset moves from location to location in a mobile environment. With the advent of virtual computing devices, such problems are only exacerbated since a single hardware platform will often guest many virtual computing devices, each with its own operating system (potentially vastly different from one another), drivers, interfaces, applications, etc.

Accordingly, a need exists in the art of evaluating endpoint computing assets for better diagnosis, especially for rigorous and esoteric matters. Also, such needs to occur securely. Even more, the need extends to virtual environments, each with many domains per a single hardware platform, and to mobile environments as assets move about during use. Naturally, any improvements should further contemplate good engineering practices, such as ease of implementation, unobtrusiveness, stability, etc.

SUMMARY OF THE INVENTION

The foregoing and other problems become solved by applying the principles and teachings associated with the hereinafter-described methods and apparatus. At a high level, embodiments involve evaluating endpoint computing assets (e.g., laptop, PDA, phone, etc.). The endpoint has both a traditional operating system for loading and utilizing computing applications, as is typical, and another operating system during a pre-boot phase of operation. During use, the traditional operating system identifies a last evaluation status of the computing device at a time just prior to shutting down. (As understood, however, the traditional operating system is actively writing state changes throughout the entire time the (COS) is up and running, but that the last status is the one that is last recorded by the COS (or its agent).) Representatively, this includes identifying whether the computing device has certain versions of anti-virus (AV) applications installed and updated, whether the computing device has its firewall set properly, whether the computing device can accept removable media, or any other type of status that can be identified and confirmed for compliance against a predetermined computing policy for the asset. The traditional operating system also writes the last evaluation status to a shared portion of storage or memory so that both operating systems can affirmatively know it.

Upon a next booting of the computing device, the pre-boot operating system loads and examines [reads] the last evaluation status in the shared portion. If the last evaluation status requires any completion action in order to comply with the computing policy, either or both the operating systems attend to its effectuation, including communication/handoff between the two by way of one or more security agents installed on either or both of the operating systems. In a variety of ways, but not limiting, effectuation of the completion action occurs according to: determining a present location of the computing device, quarantining the computing device such as from certain network traffic; VPN enforcement; patching applications; adjusting/monitoring firewall settings; (dis)allowing data or executable instructions from removable media or networks, managing certificates or encryption, and many more. Thereafter, the typical activities of the operating system load and the computing asset functions as a typical computing endpoint. Upon a subsequent shutdown and next boot, however, the process repeats.

Ultimately, corporate policies are enforced on corporate hardware assets independent or as a function of the physical location of the hardware. Evaluation, such as troubleshooting, repairing, determining status, etc., also occurs securely since the pre-boot phase of operation only undertakes enough processing capabilities and network interaction to accomplish the completion action to bring the last evaluation status into compliance with the computing policy (or to notify the traditional operating system which brings the last status into compliance, or both).

For example, if a last evaluation status indicates that a present AV application of the computing device needs a patch from a (fictitious) vendor website at www.onlypatchhere.com (URL), then the operating system will only allow network traffic to that URL and no other, thereby minimizing exposure to an open network until such time as the patch is completed. Similarly, a last evaluation status might indicate a compromise to an internal self-defense module of the endpoint asset. If an existing computing policy dictates that no data can be transferred from the endpoint asset to a removable media unless and until such time as the endpoint asset moves behind a firewall of an enterprise owning the asset, then the pre-boot operating system determines its present location relative to the enterprise firewall. If outside the firewall, then all data transfer via a removable media port of the computing device is prevented and security is maintained. Of course, a near infinite variety of scenarios are possible and skilled artisans will readily imagine others.

As to the computing policy, it can be set and carried directly on the endpoint asset or provided from an upstream, host, or both, or elsewhere. Also, updates to the policy can occur over time. As such, the pre-boot operating system might realtime communicate with the upstream host to ascertain whether an existing computing policy is current and/or whether further information is necessary in order to effectuate the completion action for the last evaluation status.

In certain hardware embodiments, a platform of the computing device includes a processor(s), memory (RAM, ROM, etc.) and available remote or local storage. Both the computing operating system and a pre-boot operating system are configured on the processor and each has access to a shared portion of the memory and/or available storage. A security agent, configured on one or both of the operating systems, exists such that upon shutting down the computing device, a last evaluation status of the computing device is configured to be identified by the computing operating system. Upon a subsequent booting, the pre-boot operating system ascertains whether the last evaluation status requires a completion action. If so, the security agent talks between the operating systems until effectuation of the completion action is complete. Also, the hardware platform can be configured to carry multiple computing domains in a virtual environment. As such, each domain or select domains can also have a dedicated or common pre-boot operating system for undertaking the foregoing. Similarly, the security agent can be dedicated per each domain or shared commonly.

Executable instructions loaded on one or more computing devices for undertaking the foregoing are also contemplated as are computer program products available as a download or on a computer readable medium. The computer program products are also available for installation on a network appliance or individual computing devices.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for evaluating endpoint computing assets with a secure, pre-boot operating system.

As used herein, the "pre-boot" is a phase of operation commonly referred to as the initialization and configuration by the Basic Input Output System (BIOS). Its time is generally defined by firmware that runs between a processor reset (oftentimes occurring at Power On or during a Restart) and the first instruction of the loader for the traditional Operating System (OS). Thereafter, the start of the OS load begins the period commonly referred to as OS runtime. During OS runtime, the firmware acts as an interface between software and hardware components of a computer system. As computer systems have become more sophisticated, the operational environment between the OS level and the hardware level is generally referred to as the firmware or the firmware environment.

Figure 1:
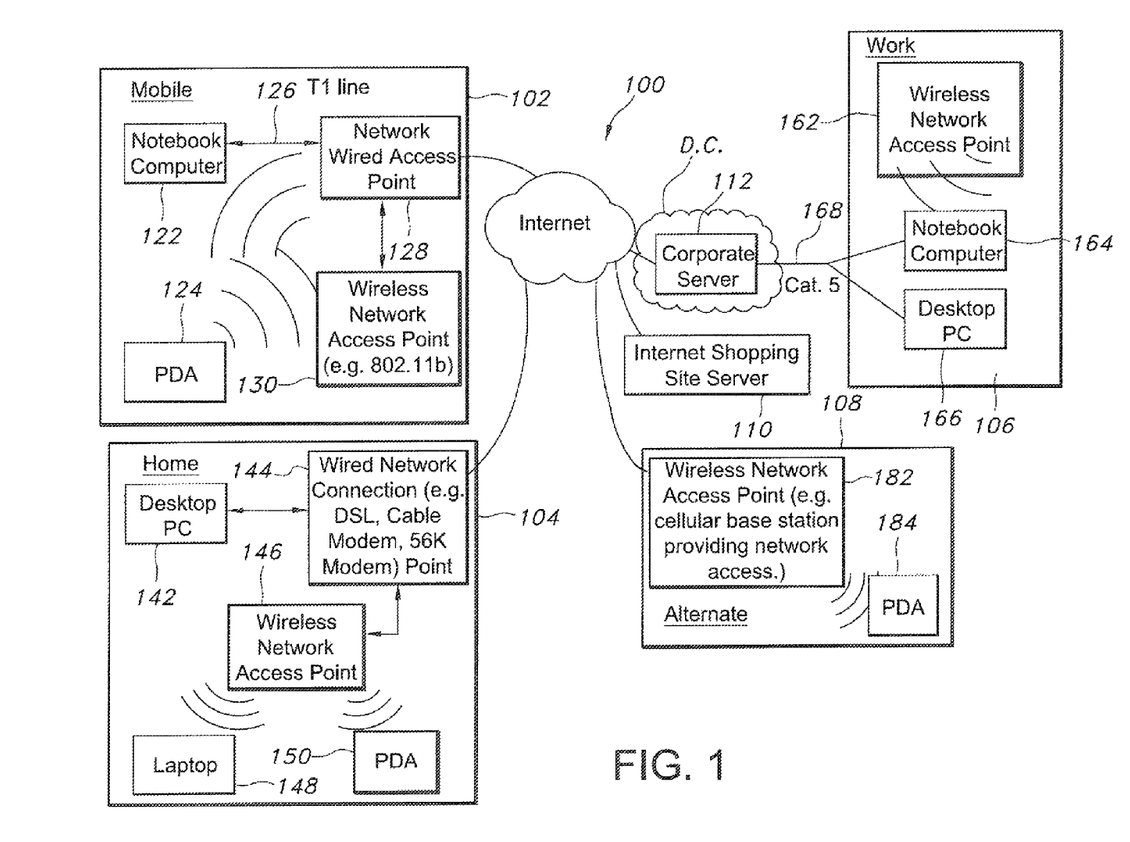
FIG. 1 is a diagrammatic view in accordance with the present invention of a representative computing environment in which an endpoint computing device may operate.

With reference to FIG. 1, a representative computing environment in which an endpoint asset or computing device will operate, and become evaluated in accordance with the invention, is given generally as 100. In category, one or more locations 102, 104, 106, 108 are available in which the endpoint may operate in the environment. Also, the asset represents a range of electronic systems (either wired or wireless) including, for example, general or special computers, desktops or laptops, phones, personal digital assistants (PDAs), audio players, or any other electronic device sophisticated enough to have an operating system and able to communicate with other electronic devices.

In a first location category, "Home" 104 is an example of a user's house, apartment, etc. whereby user's fairly often conduct work with an asset of their employer. In this category, each of endpoint computing devices 148 and 150 communicate wirelessly via a wireless network access point (NAP) 146, in turn connected to a larger network at 144. Alternatively, an endpoint computing device in the form of a desktop 142 communicates via a network connection at 144 that is directly wired.

In a second category, the location "Work" 106 is an example of a network environment maintained by a user's employer, such as a corporation or other enterprise. In the illustration, endpoints in the form of notebook and desktop computers 164, 166 have a wired CAT-5 Ethernet connection 168 to a corporate server 112, in turn, connected to other networks such as the Internet. Alternatively, the notebook computer 164 may also communicate with the server 112 through a wireless NAP 162 as illustrated. In either, skilled artisans generally associate these devices with being behind an enterprise firewall, and other appliances will likely exist as part of a larger data center (DC) environment.

In a third category, the location "Mobile" 102 represents environments such as those found at airports, hotels, restaurants, or the like, or even trains, airplanes, cruise ships, cars, etc. As such, an endpoint device, such as the illustrated notebook computer 122, might access a wired NAP 128 through a Tx line 126 and gain access to an Internet shopping site server 110 because the user desires to browse the site while awaiting an airline departure. On the other hand, the notebook computer 122 and PDA 124 might wirelessly connect to a wireless NAP 130, in this example an 802.11b connection, through which they communicate at the airport, for instance.

In a last category, an "Alternate" location is given as 108. In this environment, it is contemplate that a dedicated infrastructure might exist, such as a university campus, in which the endpoint is operating, but otherwise has no affiliation. Similarly, a "Custom" or another named location may be defined. As seen, the wireless NAP 182 in this location is associated with a cellular base station providing network access through a General Packet Radio Services (GPRS) system, Global System for Mobile communication (GSM) system, third generation wireless 3G system or other kind of mobile wireless communication system.

Additionally, as discussed below, each location may have a predetermined computing policy that defines how and to what extent an endpoint computing asset may operate, such as by communicating with other devices, transferring data, surfing the Internet, undertaking downloads, patching applications, etc. In turn, the evaluation of the endpoint asset may vary from location to location. Optionally, it is even relevant that the computing policy take into account the actual connection type of the endpoint asset, such as wired or wireless, and/or the specifics thereof, e.g., T1 line, 802.11, VPN, firewall setting, etc. Of course, a "default" policy could be further introduced that sets a minimum or maximum threshold of security, for example, or that exists in situations when the actual location of the endpoint device cannot be ascertained or guaranteed to a policy's satisfaction, or for any other reason.

Figure 2A:
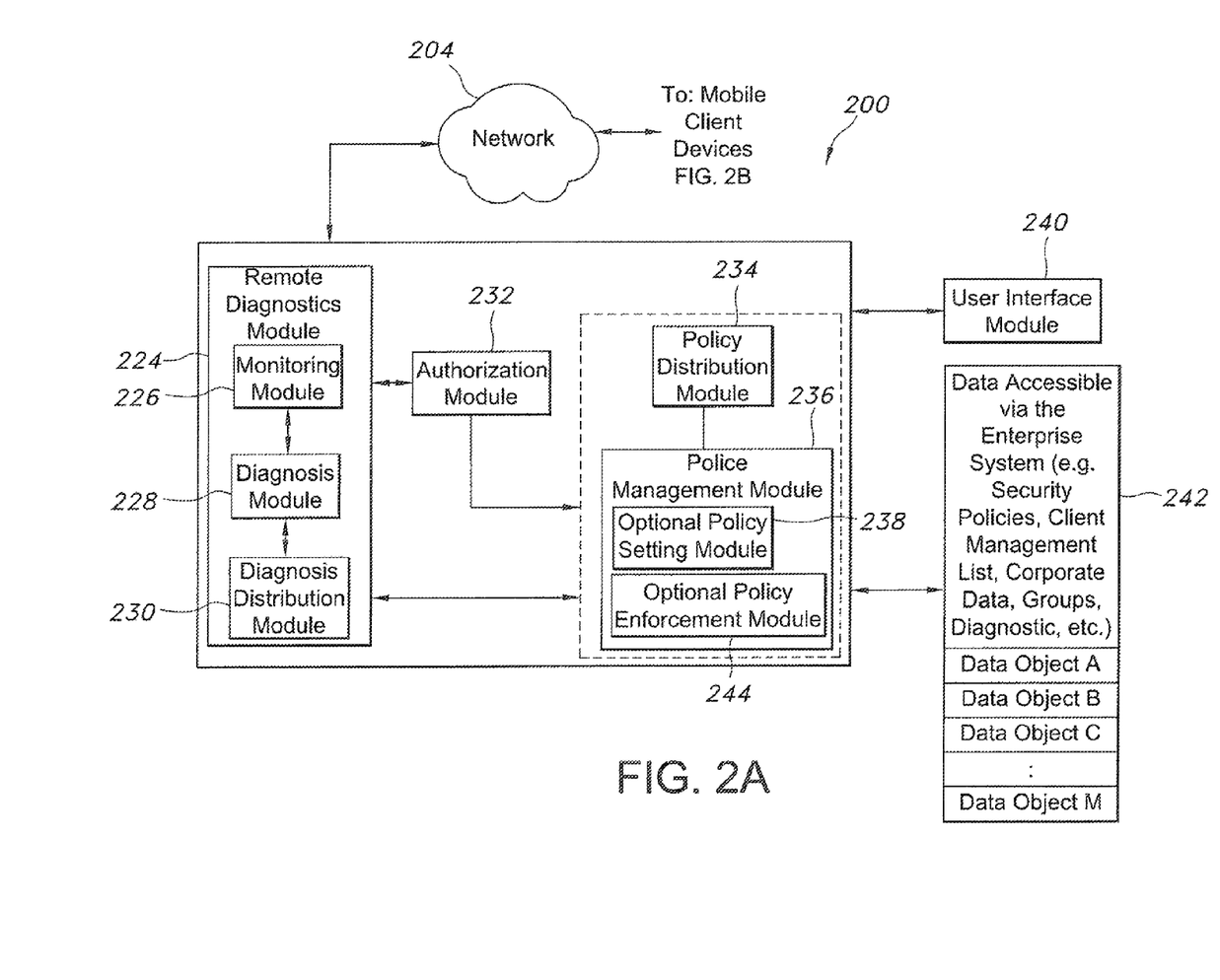
FIGS. 2A and 2B are diagrammatic views in accordance with the present invention of opposite ends of the representative computing environment illustrating computing devices as a host and client.
Figure 2B:
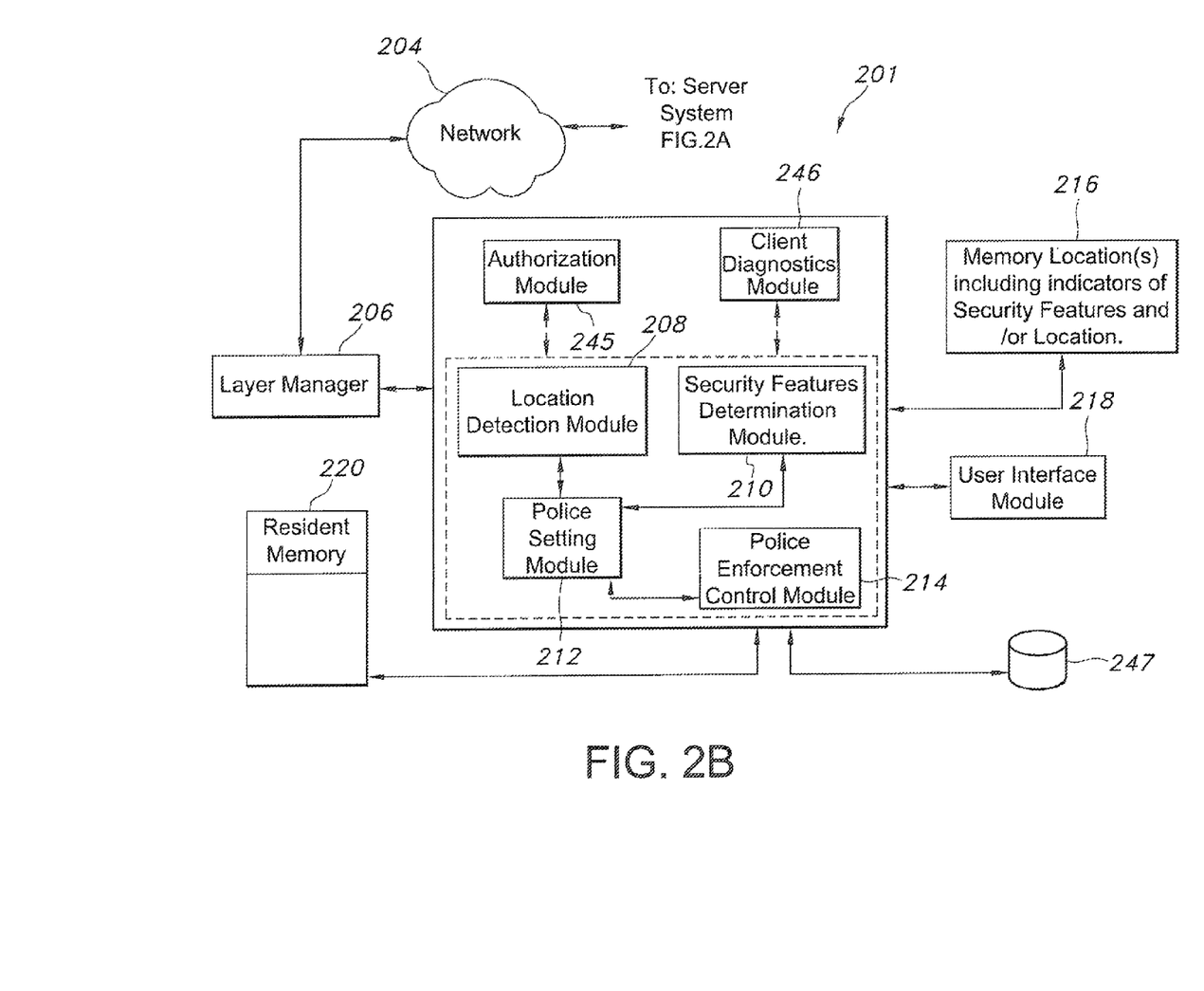

With reference to FIGS. 2A and 2B, a representative illustration of the computing environment of FIG. 1 is used for a computer system 200 (FIG. 2A) acting in a host, server role with respect to an endpoint asset in the form of a mobile, laptop 201 (FIG. 2B) acting in a client role. Similarly, FIGS. 2A and 2B also illustrate interaction between the server computer system 200 and the client 201 for the purpose of evaluating the client, e.g., troubleshooting, repairing, determining status, etc., especially by way of a pre-boot, secure operating system.

In this regard, the system 200 may be implemented as software executing in a standalone computer having a processor being accessible to memory, the processor being communicatively coupled with one or more network interfaces, a display and input/output devices such as a keyboard and a pointing device. Similarly, the system 200 may be implemented by a series of networked computers as may be typically implemented by an enterprise. Additionally, the system 200 in FIG. 2A may also be implemented in another mobile computing device. As is typical, the server or server-side system 200 allows an administrator to manage and distribute policies and software upgrades, analyze logs, and perform remote diagnostics. Similarly, the client system 201 in FIG. 2B may be implemented as software executing in a mobile computing device having a processor being accessible to memory, the processor being communicatively coupled with one or more network interfaces, a display and input/output devices such as a keyboard and a pointing device. The client side system 201 also monitors the user's changes in location and/or security features and applies the appropriate policies automatically as the user moves about or as different security features are activated or deactivated. The client 201 enforces the policies set up by the administrator, and performs diagnostics. The client 201 can also create and manage policies for the client mobile device when run in a self-managed mode.

In more detail, FIG. 2A illustrates a system 200 having an authorization module 232, a policy distribution module 234, a policy management module 236, illustrated here with an optional policy setting module 238 and an optional policy enforcement module 244, a remote diagnostics module 224 and a user interface module 240.

The policy management module 236 manages security policies. One aspect of managing security policies is defining the policies. In this example, the policy management module 236 comprises instructions for establishing a pre-defined criteria based upon user input processed by the communicatively coupled user interface module 240. Defining policies includes the creation of policies and the modification of policies. Examples of aspects of a policy includes specification of rules and permissions (e.g. policy override), defining one or more locations associated with network environments, defining or identifying security features to be monitored, ports to be monitored, network services to be monitored, applications to be monitored, enforcement mechanisms to be put in place for a particular policy, level identification for a policy or policy aspect for flexibility (optional, recommended, mandatory, invisible), and feedback (e.g. custom error messages) to alert an administrator via a user interface screen using the server system 200 of certain conditions or to alert a client device user via a user interface screen of certain conditions.

There may be several layers of policies. For instance, there may be a base policy applicable to a group of entities. Examples of entities may be users or the mobile devices themselves. In these examples, the group may include one instance of an entity. The attributes of the base policy may be incorporated into other policies which add on additional attributes. For example, a base policy for a group including engineers in a user interface design department may allow access to files on a certain disk drive. Another policy based on location that incorporates the attributes of the base policy may, on the other hand, only allow access to encrypted versions of files if a mobile device through which a UI design engineer is logged in is operating in a "Home" network location. Of course, other examples are readily imagined by skilled artisans.

In other embodiments, the policy management module 236 is provided with an enterprise's existing group structures and the policy management module compensates for a failing in the traditional makeup of groups. That is, since groups are not hierarchical, it is common for one person to be a member of several groups. To the extent each group has its own security policy, an issue can arise as to how to determine which policy to apply to a particular user. Thus, the policy management module 236 inputs a prioritized list of groups from a memory location 242. The policy management module then searches the groups in priority order of the list. In the event a person is a member of "engineering" and "executive staff," that person will get the security policy for whichever of those two groups comes first in the prioritized list. Alternatively, in the event a user is not a member of any group, there is provided a default policy on the prioritized list.

Connected to the policy management module is the policy distribution module 234. Its function is to distribute security information to the one or more client mobile devices 201.

Examples of security information are versions of existing policies, updated policies, software, or the like.

Connected to the policy management module is the authorization module 232. It functions to authorize a communication exchange between the client mobile device and the policy distribution or policy management modules. (Which, representatively, will be seen during the pre-boot phase of operation.) Primarily, it is a further safeguard against unauthorized or rogue mobile devices trying to hijack the security policies or corporate data of the endpoint device. In this regard, various authorization protocols and techniques may be used. One example is a simple username and password verification scheme. Another example is a cryptographic authentication protocol. The authorization module 232 may also be used to authorize a communication exchange between the client system 201 and the remote diagnostics module 224.

In the remote diagnostics module 224, concern is concentrated on the security or protection of data accessible by mobile client devices. However, the remote diagnostics module 224 may also function to provide diagnostic support for computer problems generally encountered by mobile client devices independently of security related software. In this embodiment, the remote diagnostics module 224 provides diagnostic assistance and/or corrective instructions with respect to problems not only associated with security but also provides such support with other problems generally encountered by mobile client devices. To accomplish this, the remote diagnostics module 224 has a communication interface with each of the user interface module 240, the authorization module 232, the policy management module 236 and the policy distribution module 234. Ultimately, this allows a person using the mobile device to get the device repaired where they are as opposed to having to mail the device or wait until he or she is back in the office ("work" location 106) to get help.

Also, the remote diagnostics module 224 comprises three sub-modules: a monitoring module 226, a diagnosis module 228, and a diagnosis distribution module 230. The monitoring module 226 receives diagnostic information such as events or audit logs from a client device and stores the information in a data object (242) for the client device. In one embodiment, a client diagnostics module (e.g. FIG. 2B, 246) periodically and automatically initiates tests (as part of the pre-boot or at other times). Results including errors from these tests are reported over a network 204 (e.g. Internet) to the remote diagnostics module 224. Other examples of diagnostic information retrieved from the client are debug output files, examples of which include system event logs, crash dumps, and diagnostic outputs from a client diagnostics module (e.g. 246, FIG. 2B). This information may be received periodically over a network 204 from the client diagnostics module 246, or upon an initial network connection by the mobile device with the server, because the client diagnostics module 246 requests diagnostic assistance, or at other times.

The diagnosis module 228 analyzes diagnostic information stored for the mobile device. For example, the diagnosis module 228 may perform analysis according to pre-stored diagnostic programs, according to an interactive user environment, a combination of the two, or other. The diagnosis module 228 may actually provide a repair to a problem in the client device, determine that a trend is occurring for the device, or determine that preventive maintenance is to be scheduled for the client device. In one example, the diagnosis module 228 initiates requests to the client mobile device for additional information. The additional information may be based on input received via the user interface module 240 or according to a pre-stored diagnosis method. In one embodiment, the diagnosis module 228 provides requested information to the user interface module 240 responsive to user input. In another embodiment, the diagnosis module 228 may provide requested information transmitted via the diagnostics distribution module 230 over the network 204 to the client mobile device responsive to requests received at a user interface module on the client device (e.g. FIG. 2B, 218).

In any event, once a diagnosis has been made with respect to a problem, support information may be distributed to the mobile device under the control of the diagnosis distribution module 230. As contemplated, "support information" may be in the form of instructions or code to the client device to repair a problem or perform maintenance. This provides an advantage of taking corrective or preventive actions without requiring user intervention or action. In another form, "support information" may be forwarded as messages for display by the client device in providing a diagnostic report or requesting specific input from a user of the device. Naturally, either or both of the monitoring module 226 or the diagnosis module 228 may initiate tests and/or queries to determine the readiness or robustness of the existing client device population. Trends may be noted. Again, these tests may be run during a connection with a device without requiring user intervention.

In still other embodiments, the remote diagnostics module 224 may also probe a particular client to verify its status. For example, client configuration information may be retrieved such as the current version of the security policy software components on the client device, the current policy settings on the device, and attributes in accordance with those settings, for example, which ports are blocked. This information may be stored for later assistance in a diagnostics situation or for use with a current diagnostics situation.

With reference to FIG. 2B, the client 201 includes a location detection module 208, a policy setting module 212, security features determination module 210, a policy enforcement control module 214, a layer manager 206, a user interface module 218, particular memory location(s) 216 in an otherwise attendant memory 220 (ROM, RAM, etc.), an authorization module 245, a client diagnostics module 246, and access to remote or local storage 247, e.g., disk.

In more detail, the authorization module 245 is configured to provide authorization information to the authorization module 232 of the server system 200 to establish communication exchanges with the client mobile device for the exchange of security information or diagnostic information or both. The client diagnostics module 246, on the other hand, collects diagnostic information which is sent to the remote diagnostics module 224 of the server system embodiment 200.

In the layer manager 206, a communications interface is established to one or more of the other modules 208, 210, 212, 214, 245, 246. In function, the layer manager processes network traffic which may include inbound data (e.g. from 242, FIG. 2A) accessible over a network and outbound copies of data objects from resident memory 220. In this embodiment, the layer manager 206 processes information in one or more layers of a model for communications between computers in a network. An example of such a model is the Open Systems Interconnection (OSI) data communications model. As is known, the OSI includes seven layers arranged as: the physical layer, the data-link layer, the network layer, the transport layer, the session layer, the presentation layer, and the application layer. Of course, another example of a model is the layered Internet Protocol stack. In this regard, skilled artisans understand four layers to be arranged as the subnetwork layer, the Internet layer, the transport layer, and the application layer.

In either, if the layer manager 206 forwards network parameters to the location detection module 208, the location detection module detects or determines the location (e.g., 102, 104, 106, 108, FIG. 1) associated with the current network environment. As a function of the predetermined computing policy for the endpoint from the server system 200, the policy setting module 212 receives, installs and updates security or other information, based on the location. Such may be found as indicators in memory locations 216 read by the policy setting module 212. Alternatively, they may include security policies and/or software updates received from the policy management module 236 via the policy distribution module 234 over the network connection 204. In addition, the policy setting module 212 may define criteria or, if permissions set by the policy management module 236 allow, supplemental policy definitions or customization of policy definitions based upon user input processed by the mobile device user interface module 218. Similarly, if operating in a standalone mode not under the control of the server system, the policy setting module 212 defines an aspect of a policy such as location criteria or security features criteria based upon user input processed by user interface module 218. The policy setting module 212 may also undertake these events periodically, randomly, and/or responsive to a notification message from another module, such as the location detection module 208.

In an alternate embodiment, an optional policy setting module 238 may operate on a server computer system such as the one illustrated in FIG. 2A that determines the selection of the current security policy for the mobile device based on criteria information received from the mobile device including location and activity status of one or more security features or based on network parameters forwarded by the layer manager 206. In this embodiment, a module on the client device such as the policy enforcement control module 214 receives commands from the policy setting module 238 and executes them on the mobile device.

Alternatively still, a user can direct the policy by way of a user interface module 218. As is typical, the user interface module 218 receives input from a user input device such as a keyboard, mouse or touch pad.

In other aspects, a security feature module 210 determines whether one or more security features have an activity status of inactive or active in a communication session between the mobile device and another computer. An example of this is determining whether a connection type to the other computer is wired or wireless. Simply enough, this can be indicated by associating the port over which data is being communicated, e.g., a wireless adapter, a network interface card (NIC), etc. In another example, further details of the connection may be indicated by subdivision into further distinctions (e.g. wireless: 802.11, GPRS, GSM, 3G, etc., or wired: modem, digital subscriber line (DSL), T1 line, etc). In other embodiments, policies may be set based on these items. For example, a different security policy may be applied for different vendor brands of NICs or particular classes (e.g. 802.3, 802.11a, 802.11b, GPRS, GSM) of NICs. Furthermore, different security policies may be assigned based on a type of operating system (Unix, Linux, Windows, Leopard, etc.) employed or the version (e.g., 3.1, 3.2, 3.3) of the operating system because different systems or versions provide different security features. Furthermore, different policies may be employed based on the security features (e.g. a firewall) provided by different types of network access points (NAP). Additionally, the presence or absence of upgraded NIC support for enhanced security protocols (e.g. 802.11i), or the presence or absence of security software such as virtual private network (VPN), or anti-virus software, or intrusion-detection software may be the basis for setting different policies on a particular port, network adapter or data.

Figure 3:
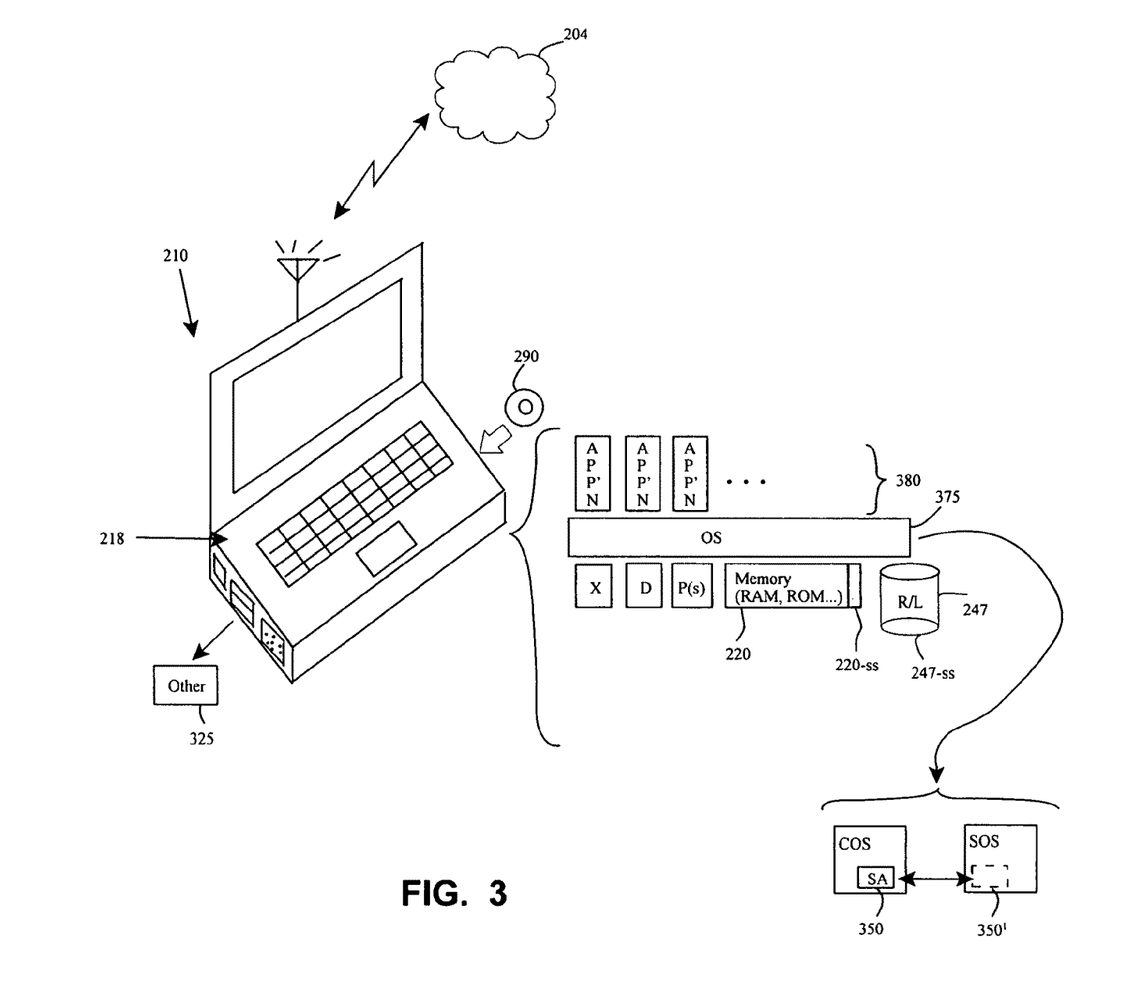
FIG. 3 is a diagrammatic view in accordance with the present invention of a representative endpoint asset in the form of a laptop computing device including a pre-boot operating system.

Leveraging the foregoing, FIG. 3 begins the detailed illustration of the mechanics for actually diagnosing the endpoint computing asset (e.g., 201) by way of a secure, pre-boot operating system. Preliminarily, however, further tangible items exist on the computing asset 201, in addition to the modules described in FIG. 2B, such as a hardware platform upon which the firmware, operating system 375 and computing applications 380 are found. As is typical, the hardware platform embodies physical I/O and platform devices, memory (M) 240 (RAM, ROM, etc.), one or more processor (s) (P), such as a CPU, drivers (D) and interfaces (X) to internal or other items 325, and access to remote or local storage 247.

Also, the memory and/or storage have a shared portion 220-SS (SS: shared store), 247-SS, that both the traditional operating system (COS: for computing operating system) and pre-boot operating system (SOS: for secure operating system) can access, such as by writing to and reading from. Either or both of the traditional and pre-boot operating systems can also include an embedded agent (security agent (SA) 350, 350') for communicating/handing-off information from one operating system to another during use. In turn, various sub-agents, not shown, may be utilized for detailed aspects of the communication.

Figure 4:
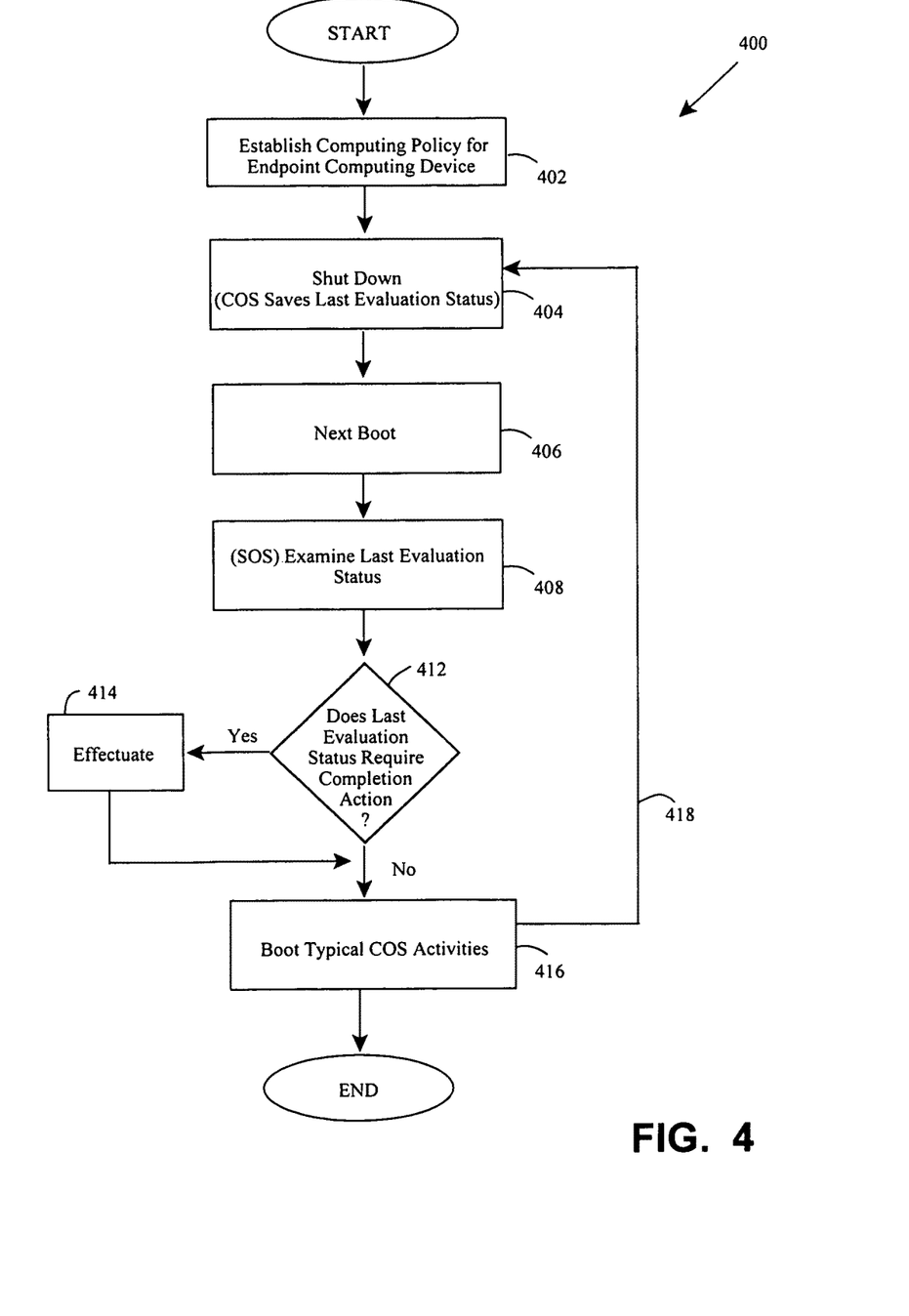
FIG. 4 is a flow chart in accordance with the present invention for evaluating an endpoint asset with a secure pre-boot operating system.

With reference to FIG. 4, a representative method of securing an operating system of a computing device, having both a pre-boot and traditional operating system, is given generally as 400. In a first step, 402, a computing policy is established for the endpoint computing device. As before (e.g. FIG. 2B), this can be based on a variety of criteria, such as a location of the device during use, a connection type, an active status, user input, user identity/group, etc. It can also be set and developed per independent endpoints, can be foisted upon the endpoint asset from an upstream host (FIG. 2A), can be set by a user, etc. It can also be updated over time.

Once set, however, each endpoint asset will have an initial boot upon powering up for a very first use, or after a rebuild/reconfiguration etc., step 404. In this regard, the device powers on, BIOS is configured, the SOS is loaded and then handed off to the COS where typical operations of the computing device are loaded, e.g., computing applications for word processing, internet browsers, email, etc. This first boot, however, is largely uninteresting to endpoint evaluation since the device is either brand new or newly reconfigured. The more interesting details to endpoint evaluation, in the context of a secure, pre-boot, occur subsequent to this, as will be seen.

For example, at step 406, the endpoint device shuts down (such as upon a user indicating this on a start menu) and the COS determines and saves a 'last evaluation status' of the device at a time just prior to powering-off or rebooting. (Again, this is understood as the last status recorded by the COS (or its agent) since the traditional operating system is actively writing state changes throughout the entire time the (COS) is up and running.) Representatively, this includes identifying whether the computing device has certain versions of anti-virus (AV) applications installed and updated, whether the computing device has its firewall set properly, whether the computing device can accept removable media, or any other type of status that can be identified and confirmed for compliance against the predetermined computing policy set for the asset in step 402. The traditional operating system also writes the last evaluation status to the shared portion of the memory 220-SS or disk 247-SS (FIG. 3) so that both the COS and SOS can know the last status.

Figure 5:
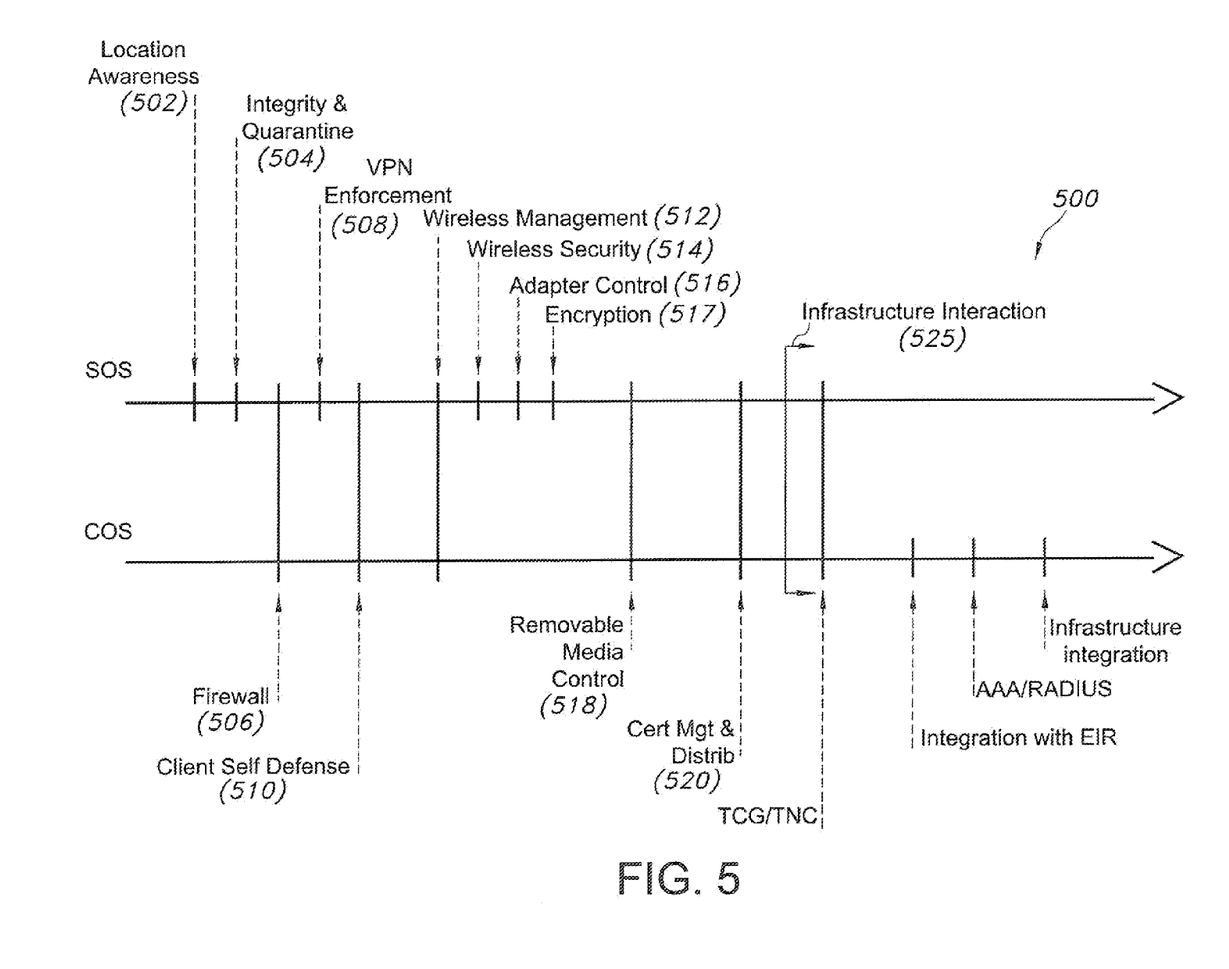
FIG. 5 is a diagrammatic view in accordance with the present invention of a representative time line and relationship for both a pre-boot and traditional operating system.

Upon a next booting of the computing device, step 408, the pre-boot operating system loads and examines [reads] the last evaluation status in the shared portion, step 410. If, at decision step 412, the last evaluation status requires any completion action in order to get the last evaluation status into compliance with the computing policy, either or both the operating systems attend to its effectuation, step 414, including communication/handoff between the two so both know the present status of the effectuation. In a variety of ways, but not limiting, effectuation of the completion action occurs according to: determining a present location of the computing device, quarantining the computing device from certain network traffic; VPN enforcement; patching applications; adjusting firewall settings; (dis)allowing data or executable instructions from removable media or networks, etc. With reference to FIG. 5, and the Examples below, even more details about this will be given.

If, on the other hand at decision step 412, the last evaluation status does not require any completion action to get into compliance with the policy of step 402, the typical activities of the COS load and the computing asset functions as a typical computing endpoint, step 416. Upon a subsequent shutdown 406 and next boot 408, however, the process repeats. The process can also repeat indefinitely for the life of the device as indicated by the infinite loop 418 in the Figure. Alternatively, however, the process can end, such as at a predetermined time, upon indication from an upstream host or user, or by any other means.

PROSPECTIVE, NON-LIMITING EXAMPLES

Example 1

The SOS determines a problem in the endpoint asset during evaluation and enforcement to effectuate the completion action occurs by way of the COS.
1. The COS is running, and determines that an Anti-virus (AV) definition file has a date of Oct. 27, 2008, and its version is 344.
2. The COS saves this Anti-virus information (the 'last evaluation status') into the SS, step 406.
3. The user eventually turns off the computer's power (shut down), but does so before the COS checks in to the corporate server (FIG. 2A) to get a new policy.
4. The computer subsequently starts up, step 408, and the SOS is loaded.
5. The SOS communicates back to a central server (FIG. 2A), and receives information (updated policy, step 402) that there is an important new AV definition file, dated Nov. 6, 2008, version 351, that can deal with a very potent new virus ("completion action"). The new AV definition file can be downloaded from www.CoolNewAV.com. (Step 412: determining the completion action for the last evaluation status.)
6. The SOS reads the SS, and sees that the COS recognizes an old (Oct. 27, 2008) AV definition file (step 410).
HEREAFTER, Step 414:
7. The SOS saves the new AV definition file requirements in the SS.
8. The SOS completes, and the COS is loaded.
9. The COS, at startup, reads the SS, and sees that it must get the new AV file, and not allow any other network traffic.
10. The COS places the computer in a quarantine state, and only allows network transmissions to www.CoolNewAV.com, and prompts the user to download the new AV file.

Example 2

The COS determines a problem in the endpoint asset during evaluation and enforcement to effectuate the completion action of the last evaluation status occurs by way of both the COS and SOS
1. The COS is running, and determines a hack with its Client Self Defense (CSD) module (602, FIG. 6).
2. COS writes the hack information to the SS, indicating to the SOS that it should not allow any data to be transferred to removable media unless inside the corporate firewall (last evaluation status).
3. COS forces the computing device to shut down (step 406).
4. The computer starts up, step 408, loading and running the SOS.
5. The SOS reads the SS, step 410, and sees (by confirming with the computing policy, step 402) that it must restrict access to removable media unless behind the corporate firewall (i.e. at the Work location). (Step 412: determining the completion action for the last evaluation status.)
HEREAFTER, step 414.
6. The SOS interrogates its Location Detection Module 208, and determines it is at an unknown location.
7. The SOS restricts access to removable media (only while the SOS is running).
8. The SOS writes its current state (restricting access to removable media) to the SS.
9. The SOS completes, and the COS starts running.
10. The COS, at startup, reads the SS, and sees (according to policy) that it must block access to the removable media until behind the corporate firewall.
11. The COS interrogates its Location Detection Module, and determines it is at an unknown location.
12. The COS continues to restrict access to the removable media devices.

Naturally, many more examples can be imagined by the artisan of ordinary skill in the art. Appreciating that a near endless variety of examples can occur, FIG. 5 illustrates one potential time line 500 for undertaking representative events in the secure pre-boot phase of operation, including securing the COS for its activities. The time line also considers the modules, and their attendant activities, of the endpoint computing asset described in FIG. 2B, for instance. Naturally, other orders of events can occur, including all of the events shown, some or none of the events shown, or even other events.

At 502, the Location Detection Module of the endpoint asset determines its present location, and tracks this as the asset moves during use. Thereafter, a variety of completion actions for the last evaluation status of the computing device are shown.

At 504, it is determined whether the computing device will need to be quarantined from certain network traffic so that only the completion action can be effectuated when in the pre-boot phase and interfacing with a network environment, as in Example 1 above for a dated AV definition file. Other potential quarantines from an open network might occur in the context of having appropriate de/encryption files, OS patches, VPN packages, etc.

At 506, the firewall of the computing device is contemplated for instances of ensuring proper attributes, settings, or the like, especially in accordance with computing policy, according to location.

At 508, VPN enforcement contemplates policies, per a location category such as Mobile 102 in a hotel, that ensure network traffic only occur in a VPN environment, such as when obtaining the AV patch in Example 1 from www.CoolNewAV.com.

Figure 6:
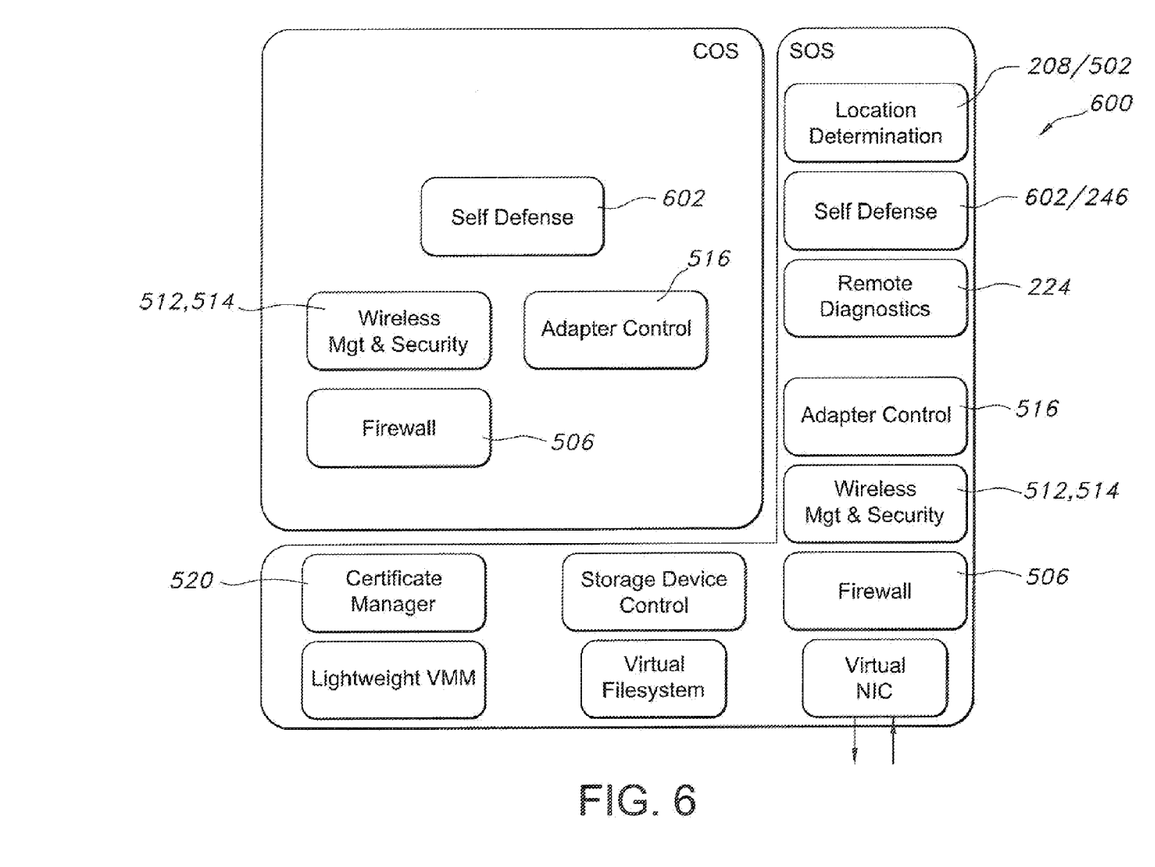
FIG. 6 is a diagrammatic view in accordance with the present invention of a representative architecture for the pre-boot and traditional operating systems of an endpoint asset.

At 510, client self defense (CSD) contemplates the scenario as in Example 2 above pertaining to a compromise or other 'hack' in the CSD module 602 (FIG. 6). Examples of other tasks here include those of the client diagnostics module 246 (FIG. 2B) that may be performed to provide diagnostic information to the remote diagnostics module 224 on the server computer system 200 including enabling and disabling advanced debugging and sending debugging output to the server computer system 200. For example, enabling and disabling advanced debugging includes turning on system event logging with options including which parameters to log, when to log, etc. and allowing a debug version of a system component to be installed. In this example, the system event log or portions of it and any special debug output files that debug components are sent to the remote diagnostics module 224 on the server.

At 512, wireless management is invoked when contemplating various wireless protocols, such as 802.1x (as before, FIG. 2) various layers per the layer manager 206 (FIG. 2B) etc. Namely, the policy setting module 212 communicates the current security policy to the policy enforcement control module 214 via a communication interface implemented in the same manner described in any one of the examples discussed above with respect to the location detection module 208 or in any manner known to those of ordinary skill in the art. The policy enforcement module 214 comprises one or more enforcement mechanism modules as specified by the policy. For example, in a communication session between the mobile device and another computer in which data is being transferred over a wireless connection, based on this connection type, in one example, the enforcement module 214 may prevent certain files from being transferred over the wireless connection as opposed to the cases in which the data is being transferred over a wired connection, or the case in which 802.11i cryptography is being used over the wireless connection. Again, in an alternate embodiment the policy enforcement control module 244 may operate as part of a separate computer system that transfers commands over a network to the mobile device. In the illustrated embodiment of FIG. 2B, a remote diagnostics module 246 processes events and performs audits relating to processing performed by one or more of the modules. The remote diagnostics module 246 transmits over a network 204 diagnostic information to the remote diagnostic module 224 on the server computer system. Examples of tasks that the diagnostics module 246 performs in order to obtain diagnostics information are as follows: Verify that correct files are in correct locations; Verify (e.g. checksum) all files to verify no corruption; Verify time/date stamps for correct versions; Check for outdated installation (INF, PNF) files; Verify that all registry entries are correct and correct any errors found. For example, it is verified whether the indications of the installation of the network interface cards (NICs) is accurate.

At 514, wireless security involves items such as whether the endpoint asset is connecting to the network via a wi-fi protected access (WPA) or a wired equivalent policy (WEP), or filtering certain SSIDs on an NAP, etc.

In either of 504, 512, or 514, the SOS security agent could additionally enforce/facilitate higher levels of 802.1x authentication (such as EAP-TLS, EAP-PEAP). Also, controlling and enforcing the authentication of remote diagnostics mechanisms provided by the prior art is not part of their inherent design and thus an improved part of this invention.

At 516, adapter control contemplates whether certain motherboards, such as those by Cisco and IBM, require handling of traffic through prescribed adapters.

At 517, encryption contemplates encoding/decoding of data, files, folders, etc. For this, items contemplated include particular encryption schemes, passing of keys, or the like.

At 518, removable media control contemplates the scenario of quarantining the endpoint asset from transferring data to a removable device, such as a flash memory, unless and until the asset is moved behind and used inside an enterprise's firewall. Of course, other removable media contemplate CDs, USB devices, etc., and a variety of ways of allowing or preventing reading and writing are known. This is especially useful in the context of military, government and other highly-sensitive contexts whereby espionage, theft, etc., is of ultimate importance.

At 520, certificates management and distribution considers the necessary and requisite exchange of certificates, handshakes, authentication, etc., at certain websites or in the context of wireless exchanges under 802.1x.

At 525 and forward, these items are those involved with the exchange of key pieces of information that are handed to one another. They are also well known in the art and associated with traditional operating systems.

As should now be apparent to skilled artisans, the foregoing involves evaluating endpoint computing assets, especially by way of a pre-boot phase of operation. In addition, when an agent becomes installed on the COS, it can undertake other assessments of the "health status" of the COS during normal operation and could also be written to the Shared Store for later access by the SOS. For example, when the computing asset crashes or fails to start on a secondary reboot, the SOS could receive a "security policy" and "health check" information from as mentioned above. This policy would dictate authentication, hardware device accessibility, and other controls for the "enforcers."

Representatively, the "enforcers" could be a variety of components (kernel drivers, windows services, authentication shims, etc) that would interrupt the security policy and enforce the controls it dictates. For example, an NDIS driver could act as a Firewall, 802.1X authentication enforcer, etc; file System filter drivers to control hard drive and removable storage access; authentication shims could enforce authentication methodologies and EAP types in 802.1x.

In a similar way, as the policy is exchanged from the COS to the SOS, certificates and other means of ensuring higher/more secure authentication methods could be exchanged. Optionally, with the NDIS firewall and other windows service(s) component(s), higher/more secure authentication methods could be enforced as well.

With reference to FIG. 6, a generic architecture is shown that overlays the various functions of FIG. 5 onto the COS or SOS, respectively, of the processor 600.

Of course, any of the foregoing embodiments contemplate that the operating system 375 (FIG. 3) and applications 380 could be also any of many individual domains in a virtual computing environment. That is, the operating system shown could be a host or guest operating system, (e.g., Linux, Windows, Netware, Unix, etc.), each with its own applications, file systems, etc. An intervening hypervisor layer (not shown), also known as a "virtual machine monitor," or virtualization manager, would exist to interface the domains to the hardware. As is known, the hypervisor is the lowest and most privileged layer and performs scheduling control between the virtual machines as they task the resources of the hardware platform, storage 247, memory (M), etc. The hypervisor also manages conflicts, among other things, caused by operating system access to privileged machine instructions. The hypervisor can also be type 1 (native) or type 2 (hosted), and skilled artisans understand the terminology. According to various partitions, the application data, boot data, or other data, executable instructions, etc., of the machines would be virtually stored on the available memory and storage. Also, each domain would have its dedicated, traditional operating system (COS), including a pre-boot operating system (SOS) that could be dedicated to each domain or common to the entirety of domains. Of course, skilled artisans can readily configure the virtual environment.

In any embodiment, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks 290 (FIG. 3) for insertion in a drive of computing device, or available as downloads or direct use from processor firmware, memory or storage of an upstream computing device. When described in the context of such computer program products, it is denoted that executable instructions thereof, such as those in components, modules, routines, programs, objects, data structures, etc., perform particular tasks or implement particular abstract data types within various structures of the computing system which cause a certain function or group of function, and enable the configuration of the foregoing.

Although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment, a method of securing an operating system of a computing device, comprising:
   establishing a predetermined computing policy to enforce upon the computing device;
   identifying a last evaluation status of the computing device as the computing device undertakes a last recording event, the last evaluation status including considerations of one or more of software and communication with other computing devices;
   upon a next booting of the computing device, loading a pre-boot operating system before said operating system;
   by the pre-boot operating system, determining if the last evaluation status requires any completion action including determining if the last evaluation status complies with the predetermined computing policy; and
   if so, effectuating the completion action.

2. The method of claim 1, wherein the effectuating the completion action further includes writing to and reading from a shared portion of a remote or local storage of the computing device available to both the operating system and the pre-boot operating system.

3. The method of claim 1, wherein the effectuating the completion action further includes quarantining the computing device from certain network traffic.

4. The method of claim 1, wherein the effectuating the completion action further includes determining a current location of the computing device as the computing device serves as an endpoint location in said computing system environment.

5. The method of claim 1, further including configuring the pre-boot operating system in firmware of one or more processors of the computing device.

6. In a computing system environment, a method of securing an operating system of a computing device having a processor, memory and storage upon which the operating systems interacts during use, comprising:
   configuring a computing operating system and a pre-boot operating system on the processor;
   by the computing operating system, identifying a last evaluation status of the computing device as the computing device undertakes a last recording and writing the last evaluation status on a shared portion of the storage or memory available to both the computing and pre-boot operating systems, the last evaluation status including considerations of one or more of software and communication with other computing devices;
   upon a next booting of the computing device, loading the pre-boot operating system;
   by the pre-boot operating system, examining the last evaluation status in the shared portion of the storage or memory;
   determining if the last evaluation status requires any completion action, including determining if the last evaluation status complies with a predetermined computing policy for the computing device; and
   if so, effectuating the completion action.

7. In a computing system environment, a method of securing an operating system of a computing device, comprising:
   identifying a last evaluation status of the computing device as the computing device shuts down, the last evaluation status including considerations of one or more of software and communication with other computing devices;
   upon a next booting of the computing device, loading a pre-boot operating system before said operating system;
   by the pre-boot operating system, examining the last evaluation status;
   determining if the last evaluation status requires any completion action, including determining if the last evaluation status complies with a predetermined computing policy for the computing device; and
   if so, from the pre-boot operating system to said operating system handing-off the completion action for effectuation.

8. The method of claim 7, upon a subsequent shutting down of the computing device, identifying a subsequent last evaluation status of the computing device.

9. The method of claim 7, further including booting applications for use with said operating system after said effectuation of the completion action.

10. In a computing system environment, a method of securing an operating system of a computing device having a processor, memory and storage upon which the operating systems interacts during use, comprising:
   configuring a computing operating system and a pre-boot operating system on the processor;
   upon booting the computing device, effectuating communication between the computing operating system and the pre-boot operating system by way of an embedded agent; and
   upon shutting down the computing device, identifying a last evaluation status of the computing device by the computing operating system, the last evaluation status including considerations of one or more of software and communication with other computing devices so that upon a subsequent booting of the computing device the pre-boot operating system can ascertain whether the last evaluation status requires a completion action and, if so, using the agent to inform the computing operating system of the completion action;

the ascertaining including determining if the last evaluation status complies with a predetermined computing policy for the computing device.

11. A computing device, comprising:
a hardware platform including a processor, memory and available storage; and
a computing operating system and a pre-boot operating system on the processor each having access to a shared portion of the memory or available storage whereby a last evaluation status of the computing device is configured to be written to and read from regarding whether a completion action is required of the last evaluation status in order to comply with a predetermined computing policy established for the computing device, the last evaluation status of the computing device including considerations of one or more of software and communication with other computing devices and being configured to be obtained by the computing operating system just prior to shutting down of the computing device.

12. The computing device of claim 11, further including a security agent on the computing operating system to communicate with the pre-boot operating system regarding the last evaluation status and compliance with the predetermined computing policy.

13. The computing device of claim 11, further including a security agent on the pre-boot operating system to communicate with the computing operating system regarding the last evaluation status and compliance with the predetermined computing policy.

14. The computing device of claim 11, further including a wireless connection point for the computing device to wirelessly communicate as an endpoint in a computing system environment.

15. A computing device, comprising:
a hardware platform including a processor, memory and available storage; and
a computing operating system and a pre-boot operating system on the processor each having access to a shared portion of the memory or available storage; and
a security agent configured on one or both of the computing and pre-boot operating systems such that upon shutting down the computing device a last evaluation status of the computing device is configured to be identified by the computing operating system, the last evaluation status including considerations of one or more of software and communication with other computing devices so that upon a subsequent booting of the computing device the pre-boot operating system can ascertain whether the last evaluation status requires a completion action and, if so, using the security agent to inform the computing operating system of the completion action;

the ascertaining including determining if the last evaluation status complies with a predetermined computing policy for the computing device.

16. A computer program product embodied in a non-transitory computer readable medium which, when loaded on a computing device, to secures an operating system of the computing device, the computer program product having executable instructions that upon shutting down the computing device identify, by the operating system, a last evaluation status of the computing device, the last evaluation status including considerations of one or more of software and communication with other computing devices so that upon a subsequent booting of the computing device a pre-boot operating system can ascertain whether the last evaluation status requires a completion action and, if so, enabling communication between the operating system and the pre-boot operating system regarding effectuation of the completion action;

the ascertaining including determining if the last evaluation status complies with a predetermined computing policy for the computing device.

17. The computer program product of claim 16, further including executable instructions to install a security agent on either or both the operating system and the pre-boot operating system for said enabling communication.

18. The computer program product of claim 16, further including executable instructions for making storage available of the last evaluation status on a shared portion of memory or disk available to the computing device.

19. The computer program product of claim 18, further including executable instructions for making the shared portion available for reading from or writing to by the operating system or the pre-boot operating system.

20. In a computing system environment, a method of evaluating a computing asset having an operating system and serving as an endpoint in the computing system environment, comprising:
configuring a pre-boot operating system on a processor of the computing asset;
upon a next booting of the computing asset, securely loading the pre-boot operating system before said operating system; and
determining if a status of the computing asset complies with a predetermined computing policy, the status being earlier obtained during a last recording event by the operating system and including considerations of one or more of software and communication with other computing devices.

* * * * *